(No Model.)
F. J. SPRAGUE.
ELECTRICAL PROPULSION OF VEHICLES.
No. 353,829. Patented Dec. 7, 1886.
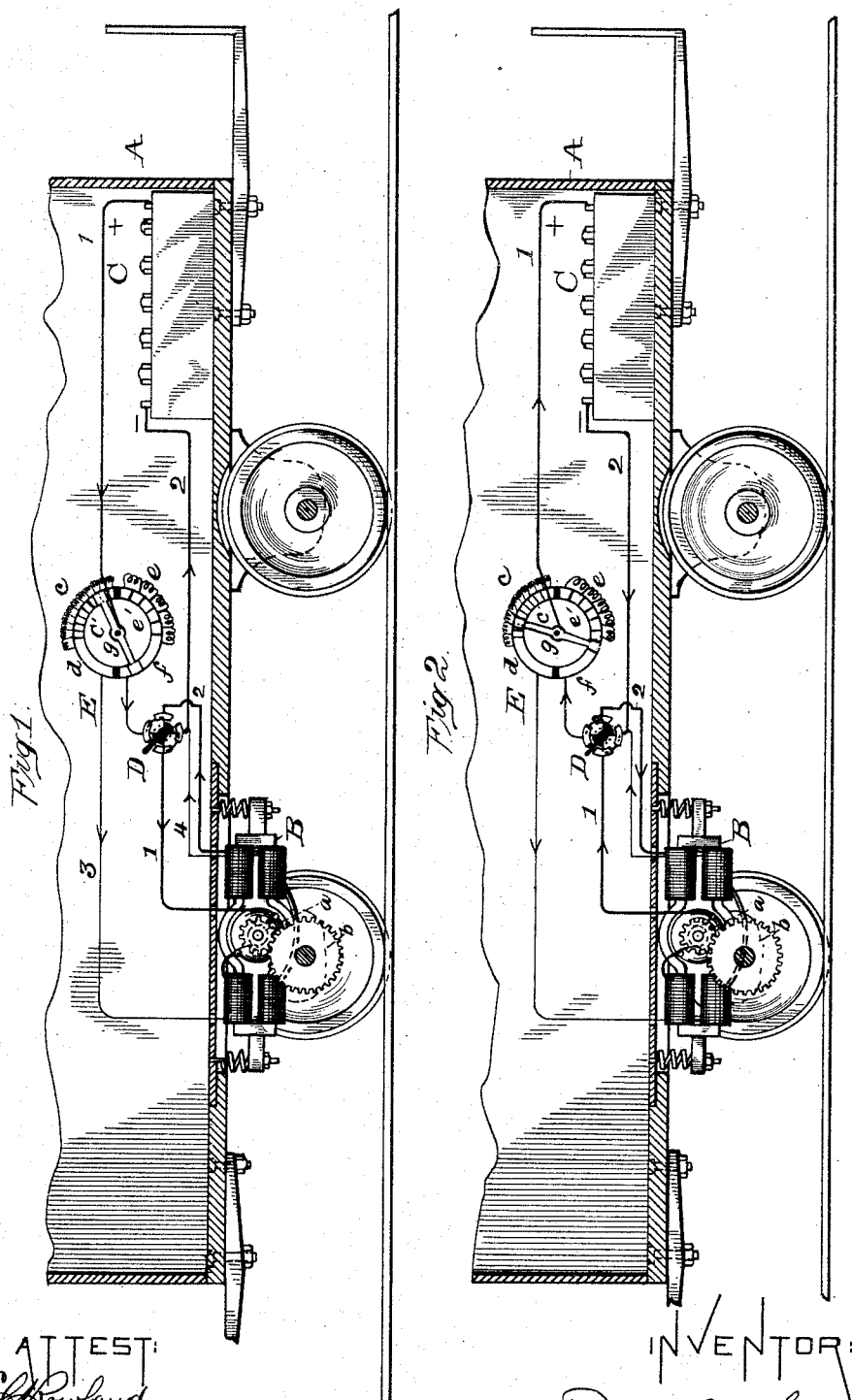

UNITED STATES PATENT OFFICE.

FRANK J. SPRAGUE, OF NEW YORK, N. Y.

ELECTRICAL PROPULSION OF VEHICLES.

SPECIFICATION forming part of Letters Patent No. 353,829, dated December 7, 1886.

Application filed June 12, 1886. Serial No. 204,931. (No model.)

*To all whom it may concern:*

Be it known that I, FRANK J. SPRAGUE, of New York, in the county and State of New York, have invented a certain new and useful Improvement in the Electrical Propulsion of Vehicles, of which the following is a specification.

My invention relates to railway-cars or other vehicles propelled by electric motors which are supplied with current by secondary batteries or electrical accumulators placed in or upon the vehicle, and my object is to utilize the momentum of the vehicle in running on a downgrade or in slowing down or stopping for the purpose of recharging the batteries. I accomplish this by increasing the counter electro-motive force of the motor-by increasing the strength of its field-magnets, as set forth in my patent, No. 318,668, dated May 26, 1885, when the vehicle is on a downgrade or slowing down until the counter electro-motive force exceeds the initial electro-motive force of the battery, whereby the machine becomes a generator giving current to the battery, instead of a motor taking current therefrom, the battery is recharged and the vehicle is braked.

My invention is illustrated in the accompanying drawings, in which Figure 1 is a sectional view of a portion of a street railway-car, for which class of vehicles my invention is especially designed, provided with means for carrying out my invention with the machine acting as a motor, the electrical connections being in diagram; and Fig. 2 shows the same with the machine running as a generator.

A is the car, and B is the motor, having its armature-shaft mechanically connected with the driving-axle of the car by cog-wheels $a\ b$; or this mechanical connection may be made in any other suitable manner.

C represents a suitable number of secondary battery cells or accumulators, which may be of any suitable and efficient character. The motor may be of any suitable and efficient character. 1 2 is its armature-circuit, extending to the battery terminals. A portion of the field-coils are in this circuit. 3 4 is the main field-circuit, of finer wire, shunted on the armature-circuit. The arrow-heads show the direction of current.

D is the reversing-switch, for changing the direction of rotation of the armature.

E is the resistance-adjusting commutator for the armature and main field circuits. Resistance-coils $c$ are for the field-circuit, and are connected with short contacts $c'$ and long contact $d$. Coils $e$ for the armature-circuit are connected with short contacts $e'$ and long contact $f$. Pivoted arm $g$, connected with wire $l$, is arranged to travel upon the blocks at both its ends, whereby the field-circuit coils are affected independently of the armature-circuit and the armature-coils independently of the field-circuit.

The operation of my invention is as follows: When arm $g$ is in the position shown in Fig. 1, most of the coils $c$ are in the field-circuit. There is a weak field, and the machine is running as a motor to propel the car on a level or an upgrade. The speed may then be regulated by adjusting arm $g$ on a portion of blocks $c'$. When, however, the motor is on a downgrade, or when it is to be slowed down or stopped, the arm $g$ is moved so as to cut out coils $c$, as seen in Fig. 2, whereby the field-magnet is strengthened, and the counter electro-motive force is made to overcome the electro-motive force of the battery, whereby the machine becomes a generator propelled by the momentum of the vehicle, current is given to the battery to recharge the same, and the vehicle is braked by the load thus placed on the generator. By this means the power required to brake the vehicle is stored up and can be subsequently used to propel the vehicle. In addition, the charge of the batteries is made to last longer, and therefore they do not have to be recharged so often, whereby expense and time are saved. The electro-motive force of the batteries is kept up and their efficiency maintained, and the disintegration due to rapid discharging, which has heretofore been an objectionable feature in the use of storage-batteries, is removed.

The vehicle may of course be one used to propel a train of other vehicles, or it may be provided with more than one motor connected in a suitable manner, if desired.

Other means may be employed for changing the strength of the field-magnets than that shown—for instance, any of the arrangements set forth in my prior patents. I may, in addition, employ the arrangement set forth in my patent, No. 340,684, dated April 27, 1866—that is, I may throw the armature upon a local breaking-circuit, in order to completely stop the vehicle, should it be necessary to do so.

I would state that by the expression "shunt-wound" electric motor in the claims I refer to those motors having their main field-coils in shunt relation to the armature, whether or not a coil in series with the armature is also provided.

What I claim is—

1. The method herein described of operating a vehicle propelled by an electric motor supplied with current from a secondary battery carried by the vehicle, consisting in braking the vehicle and returning current to the secondary battery to recharge it by raising the counter electro-motive force of the motor until it exceeds the electro-motive force of the battery when the vehicle is on a downgrade or slowing down.

2. The method herein described of operating a vehicle propelled by a shunt-wound electric motor supplied with current from a secondary battery carried by the vehicle, consisting in braking the vehicle and returning current to the secondary battery to recharge it by increasing the strength of the field-magnet of the motor until its counter electro-motive force exceeds the electro-motive force of the battery when the vehicle is on a downgrade or slowing down.

3. The combination of a vehicle, a shunt-wound electric motor having its armature mechanically connected with an axle of said vehicle, a secondary battery carried by said vehicle and electrically connected with said motor, and means for varying the strength of the field-magnet of said motor, whereby the said motor may be converted into a generator to brake the train and recharge the secondary battery when the vehicle is on a downgrade or slowing down, substantially as set forth.

This specification signed and witnessed this 1st day of June, 1886.

FRANK J. SPRAGUE.

Witnesses:
WM. PELZER,
E. C. ROWLAND.